Patented Jan. 29, 1924.

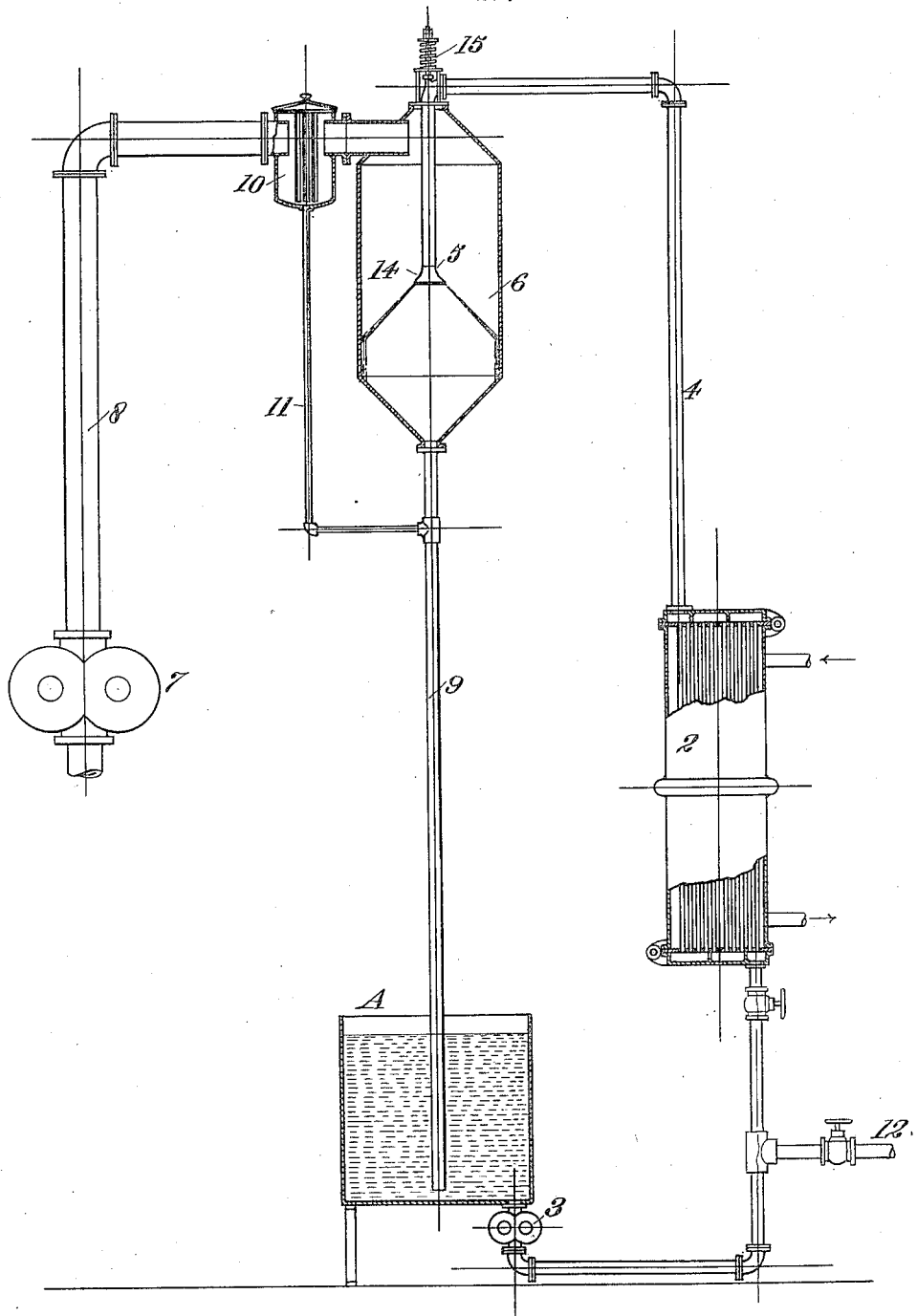

1,482,143

UNITED STATES PATENT OFFICE.

DAVID D. PEEBLES, OF EUREKA, CALIFORNIA.

APPARATUS FOR CONCENTRATING MILK.

Application filed November 27, 1918. Serial No. 264,421.

*To all whom it may concern:*

Be it known that I, DAVID D. PEEBLES, a citizen of the United States, residing at Eureka, in the county of Humboldt and State of California, have invented new and useful Improvements in Apparatus for Concentrating Milk, of which the following is a specification.

This invention relates to the dehydration, condensation and concentration of liquids, and pertains especially to an apparatus for the concentration of various liquids, including milk, such an apparatus being indicated in my copending application entitled Method of concentrating milk, filed Oct. 30, 1918, Ser. No. 260,228, matured into Patent 1,438,502, dated Dec. 12, 1922.

The drawing represents the present invention.

The object of the invention is to provide a simple, compact and practical dehydrating and condensing apparatus applicable for various uses where it is desired to concentrate particular liquid undergoing treatment, conveniently, economically, and without deterioration to the product. The invention was originally designed in conjunction with the concentration of tan bark solution, having the object in view of extracting the essentials of tan bark at or near the region of growth, usually in rough, mountainous country, to enable its convenient and ready transportation. Further developments and adaptations of the invention brought about its extensive use in the handling of milk under the process and conditions set out in the aforesaid co-pending application.

The invention is best understood in its practical application to the treatment of milk although it will be manifest that it is not to be limited to the handling of any particular liquid. Generally speaking, the invention comprehends the heating, evaporation, condensation and re-circulation of the liquid to undergo treatment, and at such a degree of vacuum as is best suited for the particular case in hand; the continued circulation being cyclical in nature so that each cycle causes a greater degree of concentration to be effected until the desired result is obtained, there being provided means for producing the circulation, effecting the most economical character of vaporization in the vacuum chamber where evaporation takes place, and means for withdrawing the vapors and returning any condensate back into the circulating system which may be entrained over into the vacuum line. In its particular application to the handling or the treatment of milk the apparatus provides means whereby the milk is concentrated to any desired degree without material loss of the milk values by evaporation, and in which apparatus the heating, sterilizing, evaporation, condensation and recirculation are essentially carried on at temperatures either above or below the incubating temperatures, and at temperatures at which the milk is not detrimentally affected. In short, the practical embodiment of the apparatus brings about a concentrated milk product in which bacterial growth has been destroyed or arrested, the milk has longer keeping qualities and the product possesses the original flavor of the natural milk, a desideratum which has hitherto not been possible by any known process.

Again, the invention may be said to comprehend essentially the continuous and successive circulation of the liquid to be evaporated or concentrated through the heater and thence into and through an expansion chamber, and then back into the heater until the desired degree of concentration has been effected; maintaining the temperature in the heater at such a point that with milk the heat is raised sufficiently above the incubating temperature of the bacteria contained in the milk, this temperature above which the bacteria will germinate being a temperature that is destructive to the bacteria; maintaining this high temperature for only a relatively brief period of time, so that the milk will not be detrimentally affected in its chemical or physical constituency but will acquire the desired heat head for the next step, which is: the delivery of the heated milk into the expansion chamber wherein is maintained a sufficiently high vacuum to remove the moisture by explosive effect so that the moisture in the bacteria suddenly expands, thereby disrupting the bacteria. The release of the milk or other liquid into the vacuum chamber also immediately chills the liquid, below the temperature at which germination of bacteria is promoted, or at least at which lower temperature in the vacuum expansion chamber germination is greatly retarded. The milk after passing through the vacuum chamber is shortly returned ot the heater and raised to a relatively high temperature again, so that at no period during the cycle does the milk remain at such a temperature as permits material development of the bacteria.

Before passing on to a description of the apparatus in detail, certain general principles recognized in the evaporation or condensation of milk may be mentioned. It is frequently stated that milk must not be heated over 165° F. as at this temperature the albumen has a tendency to coagulate and the flavor of the milk is materially injured. The effect that this or any other temperature has on the milk depends, of course, in a large measure on the length of time that the milk is maintained at this particular temperature. The object of heating the milk to 165° F. or thereabouts is, of course, to effect pasteurization. It is also desirous not to keep the milk at a temperature of from 100° F. to 135° F. for any considerable length of time as at this temperature the bacteria present in the milk germinate very rapidly; the rapidity of germination, of course, depending on the degree of the temperature, and the length of time, and the character of the bacteria, as some bacteria germinate more rapidly at one temperature than at another.

Again, in any vacuum system the temperature maintained in the vacuum depends on the degree of vacuum. For instance, a 26-inch vacuum has a relative temperature of approximately 124° F.; a 28-inch vacuum has a relative temperature of approximately 100° F.; and a 29-inch vacuum has a relative temperature of approximately 78° F.; hence the higher the vacuum the lower the temperature it is possible to operate under.

From the foregoing enunciated principles it will be obvious that in a vacuum pan system most of the operations are carried on under ideal temperatures for bacteria germination. In my apparatus the milk is alternately heated, as will be seen, to approximately 160° F., which is a pasteurizing temperature, and then cooled to the temperature of the vacuum under which the concentrator is operating, so that any bacterial growth that is in the milk will not have time to germinate before the milk again reaches a higher temperature and said bacterial growth is destroyed.

The drawing illustrates an apparatus such as has been used and is used by me in the practice of my process described in my copending application previously referred to.

A represents a suitable reservoir or tank in which the milk to be treated is first placed. 2 is a tubular heater through which the milk is circulated under pressure and at appropriate high velocity from the tank A by a pressure pump 3, of any appropriate design. From the heater the heated milk passes by a conduit 4 and discharges through a spray nozzle 5 into an evaporating and expansion chamber 6; the chamber 6 being evacuated of its air and gas so as to maintain a suitable high degree of vacuum therein through the medium of a vacuum pump 7, which is connected by a pipe 8 near the top of the chamber 6 and above the spray nozzle 5.

The chamber 6 is connected by a barometric column 9 with the reservoir A for the re-delivery into the latter of the return liquor from chamber 6. 10 is a separator positioned in the vacuum line 8 and having a return connection 11 back into the barometric column 9 for re-delivery into the system of any milk that may be carried by entrainment over from the vacuum chamber. The concentrated liquid from the evaporator, after re-delivery into the tank A, is re-circulated through the system and the cycle is repeated until a suitable degree of concentration and viscosity of the liquor under treatment is reached, when it is discharged from the line through the pipe 12. Such is, briefly, the cycle of operation.

In practice I employ a heater of the tubular type, in which the liquid is circulated through the tubes and brought to the desired temperature; time, temperature and velocity being related and important factors in this particular step of the operation.

In the evaporating chamber the degree of vacuum and the manner in which the milk or other liquid is sprayed into the evaporating chamber are likewise important factors. It is essential that the pre-heated liquid be sprayed into the expansion chamber in a downward direction or at least in a direction counter to the flow of the vapors leaving the expansion chamber at 8; the spray impinging against the sides of the expansion chamber thus rupturing whatever bubbles may be formed and allowing the liquor to flow downward along the sides of the expansion chamber in a thin film. The surface tension of the liquor prevents it being picked up by the vapors leaving it.

While any suitable character of spray nozzle may be employed, I prefer to use a bell-shaped outer casing with a spring seated conical spreader 14; the spring 15 being tensioned so that the valve may open to admit a thin conoidal film of liquid and spray it within the chamber under the pressure of the liquid current passing through the heater.

It will be manifest that various changes in the form of the apparatus may be used, without departing from the spirit of the invention as claimed.

Having thus described my invention, what I claim and desire to secure by Letters Patent is:

1. In an apparatus for dehydrating liquid substance, an expansion and vaporizing chamber, means for maintaining a vacuum in said chamber, and a pipe connection between said means and the top of said chamber, a branch pipe connected to said first mentioned pipe and the bottom of said chamber, a separator in said pipe connection, a liquid heater, a pump and pipe connection for supplying liquid through the heater to the expansion and vaporizing chamber, said last mentioned pipe connection terminating in a spraying nozzle within said chamber, said nozzle being below said first mentioned pipe connection and above the outlet of said branch pipe connection.

2. A dehydrating apparatus comprising in combination a receptacle for the liquid to be treated, an expansion chamber elevated above said receptacle, a pipe extending from the lower part of the expansion chamber to said receptacle, a pump and a heater, pipes extending from the receptacle to the pump and from the pump to the heater, a pipe leading from the heater upwardly to the upper part of the expansion chamber, a pipe extending downwardly into said chamber from the upper end of the last mentioned pipe and having at its lower end a spray nozzle, and means for exhausting the air and vapor from said chamber connected to the expansion chamber above the spray nozzle whereby both the exhausting means and said pump are adapted to contribute to the forcing of a liquid through the heater and the vapors quickly separated in the expansion chamber from the downwardly flowing liquid.

3. In an apparatus of the character described, a receptacle for liquid to be dehydrated, an expansion chamber above said receptacle, a pipe extending from the lower part of the expansion chamber to said receptacle, a pump and a heater, pipes extending from the receptacle to the pump and from the pump to the heater, a pipe leading from the heater upwardly to the upper part of the expansion chamber, a pipe extending downwardly into said chamber from the upper end of the pipe leading to the upper part of the chamber and having at its lower end a spray nozzle, and means for exhausting the air and vapors from said chamber connected to the expansion chamber above the spray nozzle, said means including a separator for depositing the liquid carried over with the vapors whereby both the exhausting means and pump are adapted to contribute to the forcing of the liquid through the heater.

4. A dehydrating apparatus comprising in combination a receptacle for the liquid to be treated, an expansion chamber elevated above said receptacle, a pipe extending from the lower part of the expansion chamber to said receptacle, a pump and a heater, pipes extending from the receptacle to the pump and from the pump to the heater, a pipe leading from the heater upwardly to the upper part of the expansion chamber, a pipe extending downwardly into said chamber from the upper end of the last mentioned pipe to near the bottom of the expansion chamber and having at its lower end a spray nozzle, and means for exhausting the air and vapors from said chamber connected to the expansion chamber above the spray nozzle, a separator between said expansion chamber and said exhausting means, and a pipe leading from the lower part of said separator to the pipe extending from the lower part of the expansion chamber whereby any of the liquid that might accidentally pass over with the vapors from the upper part of the expansion chamber may be separated and returned to the main flow of said liquid.

5. A dehydrating apparatus comprising in combination, a receptacle for the liquid to be treated, an expansion chamber elevated above said receptacle, a pipe extending from the lower part of the expansion chamber to said receptacle, a pump and a heater, a pipe extending from the receptacle to the pump, said pipe having a branch to discharge the liquid from the pump when sufficiently dehydrated, a valve for controlling the discharge, and a second valve in said pipe between the discharge and the heater, a pipe extending from the heater to the upper part of the expansion chamber, a pipe extending downwardly into said chamber from the upper end of the last mentioned pipe to the lower part of the expansion chamber, said pipe having at its lower end a spray nozzle, and means for exhausting the air and vapors from said chamber, said means being connected to the chamber above the spray nozzle whereby both the exhausting means and pump are adapted to contribute to the forcing of the liquid rapidly through the heater.

6. In an apparatus of the character described, an expansion chamber, a supply pipe extended from the upper end of the expansion chamber downwardly and having at its end a spray nozzle arranged to spread out the discharged liquid in a thin cone-shaped flow against the sides of the expansion chamber near its bottom, a vapor exhausting means connected to the upper end of the expansion chamber above the spray nozzle and having a branch connection to the expansion chamber below the spray nozzle, and a pipe to carry away the concentrated liquid.

7. In an apparatus of the character described, an expansion chamber having a cylindrical body portion and cone-shaped ends, a liquid pipe extending from the upper cone-shaped end downwardly to the end of the cylindrical body portion and having a spray nozzle at its end, exhaust means connected to the expansion chamber at its upper end, said exhaust means having therein a separating chamber with a baffle plate, a pipe extending from the lower conical end of the expansion chamber, and a pipe extending from the lower end of the separating chamber and connected to the pipe leading from the lower end of the expansion chamber as described.

In testimony whereof I have hereunto set my hand in the presence of two subscribing witnesses.

DAVID D. PEEBLES.

Witnesses:
 GEO. K. COLMAN,
 GEO. J. TOOBY.